United States Patent
Nagahashi (10) Patent No.: US 11,052,710 B2
(45) Date of Patent: Jul. 6, 2021

(54) PNEUMATIC TIRE

(71) Applicant: The Yokohama Rubber Co., LTD., Tokyo (JP)

(72) Inventor: Yuki Nagahashi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 17/257,521

(22) PCT Filed: Apr. 17, 2019

(86) PCT No.: PCT/JP2019/016516
§ 371 (c)(1),
(2) Date: Dec. 31, 2020

(87) PCT Pub. No.: WO2020/008701
PCT Pub. Date: Jan. 9, 2020

(65) Prior Publication Data
US 2021/0129598 A1 May 6, 2021

(30) Foreign Application Priority Data
Jul. 2, 2018 (JP) .............................. JP2018-126074

(51) Int. Cl.
*B60C 13/02* (2006.01)
*B60C 13/00* (2006.01)

(52) U.S. Cl.
CPC .................................. *B60C 13/001* (2013.01)

(58) Field of Classification Search
CPC ........ B60C 13/001; B60C 13/00; B60C 13/02
See application file for complete search history.

(56) References Cited

U.S. PATENT DOCUMENTS 5,645,661 A * 7/1997 Clementz ................ B60C 13/02
152/523
2008/0087362 A1 4/2008 Metz
(Continued)

FOREIGN PATENT DOCUMENTS

JP 2002-307914 10/2002
JP 2007290442 A * 11/2007
(Continued)

OTHER PUBLICATIONS

Machine Translation: JP-2011225026-A; Itoi, Hirota; (Year: 2021).*
(Continued)

*Primary Examiner* — Kendra Ly
(74) *Attorney, Agent, or Firm* — Thorpe North & Western (57) ABSTRACT

In a pneumatic tire, regions on an outer side in a radial direction of maximum width positions of outer surfaces of sidewall portions include decorative regions and display regions adjacent to the decorative regions in a circumferential direction, the decorative regions being formed by serration processing to include an array of parallel ridges, the display regions including a portion where a smooth surface without ridges extends in the circumferential direction between end portions of the decorative regions, and being including an indication formed by combining constituent units each depicting an alphanumeric, a pattern, or a symbol, a valley formed between adjacent ridges in the decorative regions being recessed relative to the smooth surface, and the display regions in one of the sidewall portions on one side and in another one of the sidewall portions on the other side being arranged at positions shifted from each other in the circumferential direction.

10 Claims, 5 Drawing Sheets

(56) References Cited

U.S. PATENT DOCUMENTS

| | | | | |
|---|---|---|---|---|
| 2009/0008015 | A1* | 1/2009 | Itoi | B60C 13/001 |
| | | | | 152/524 |
| 2010/0000649 | A1* | 1/2010 | Iwabuchi | B60C 13/001 |
| | | | | 152/523 |
| 2014/0352864 | A1 | 12/2014 | Miyasaka et al. | |
| 2015/0290981 | A1 | 10/2015 | Berger et al. | |
| 2020/0324580 | A1 | 10/2020 | Takemori | |

FOREIGN PATENT DOCUMENTS

| | | |
|---|---|---|
| JP | 2009-067355 | 4/2009 |
| JP | 2011225026 A * | 11/2011 |
| JP | 2016-501149 | 1/2016 |
| JP | 6210127 | 10/2017 |
| WO | WO 2006/015674 | 2/2006 |
| WO | WO 2009/037952 | 3/2009 |
| WO | WO 2013/125165 | 8/2013 |
| WO | WO 2014/072161 | 5/2014 |
| WO | WO 2017/204308 | 11/2017 |

OTHER PUBLICATIONS

Machine Translation: JP-2007290442-A; Itoi, Hirota; (Year: 2021).*
International Search Report for International Application No. PCT/JP2019/016516 dated Jul. 16, 2020, 4 pages, Japan.

* cited by examiner

PNEUMATIC TIRE

TECHNICAL FIELD

The present technology relates to a pneumatic tire including a sidewall portion with an outer surface provided with a decoration or an indication, and particularly relates to a pneumatic tire with which degradation of uniformity and vibration during traveling related to the decoration and the indication can be suppressed.

BACKGROUND ART

A sidewall portion of a pneumatic tire is a portion that faces the outer side of a vehicle to which the tire is mounted, and thus may be decorated in various ways. For example, a tire according to Japan Patent No. 6210127 has an outer surface of a sidewall portion provided with an indication for a manufacturer logo, a model name, or the like. Such an indication is, for example, formed by protrusion portions and recess portions protruding and recessed relative to a reference surface of the outer surface of the sidewall portion. Top and bottom surfaces of the protrusion portions and recess portions depict alphanumerics, patterns, and symbols that, in combination, represent a manufacturer logo, a model name, or the like. Furthermore, the outer surface of the sidewall portion of the tire according to Japan Patent No. 6210127 is partially provided with serration processing (processing for providing multiple minute ridges that are in parallel with each other), for the sake of better design on the tire side surface.

Such a tire is likely to have a difference in the rubber amount between a region provided with the indication (hereinafter, referred to as a display region) and a region provided with the serration processing (hereinafter, referred to as a decorative region). Specifically, the display region has a rubber amount increased/decreased from that in other portions, depending on the shape of the indication. Meanwhile, the decorative region has a rubber amount increased/decreased from that in other portions, depending on the size of the ridges. The level of increase/decrease in the rubber amount from that in other portions differs between these regions. As a result, the rubber amount differs between the display region and the decorative region. The display region and the decorative region are generally each provided in both of a pair of sidewall portions. In this context, the difference in the rubber amount described above becomes even larger when the sidewall portion on one side and the sidewall portion on the other side have the positions of the decorative regions or the display regions in the tire circumferential direction overlapping each other. Such a difference in the rubber amount may affect the uniformity of the tire and vibration during traveling. In view of this, there has been a demand for a measure for suppressing degradation of the uniformity as well as the vibration during traveling related to these regions, through optimization of the shape and the arrangement of the display region and the decorative region.

SUMMARY

The present technology provides a pneumatic tire with which degradation of uniformity as well as vibration during traveling related to an indication and a decoration on an outer surface of a sidewall portion can be suppressed.

A pneumatic tire according to the present technology includes: a tread portion extending in a tire circumferential direction to form an annular shape; a pair of sidewall portions provided on both sides of the tread portion; and a pair of bead portions provided on an inner side in a tire radial direction of the sidewall portions, regions disposed on an outer side, in a tire radial direction, of tire maximum width positions of outer surfaces of the pair of sidewall portions being provided with decorative regions and display regions that are adjacent to the decorative regions in the tire circumferential direction, the decorative regions being provided with serration processing to be formed by an array of a plurality of ridges parallel to each other, the display regions each including at least a portion where a smooth surface without the ridges extends in the tire circumferential direction between end portions of the decorative regions, and each being provided with an indication formed by combining constituent units each depicting an alphanumeric, a pattern, or a symbol, a valley formed between adjacent ones of the ridges in the decorative regions being recessed relative to the smooth surface, and the display regions provided in one of the sidewall portions on one side and the display regions provided in the other one of the sidewall portions on the other side being arranged at positions shifted from each other in the tire circumferential direction.

With the present technology, as described above, the sidewall portion on one side and the sidewall portion on the other side have the display region arranged while being shifted from each other, and thus also have the decorative regions arranged while being shifted from each other. Thus, regions with approximately the identical level of increase/decrease in the rubber amount are arranged in the sidewall portion on one side and the sidewall portion on the other side while being shifted from each other. This means that the sidewall portion on one side and the sidewall portion on the other side have regions where the rubber amount is large and regions where the rubber amount is small alternately arranged. Thus, the increase/decrease in the rubber amount can be offset between the pair of sidewall portions, whereby excellent uniformity can be achieved, and the vibration during traveling can be suppressed.

With the present technology, the ratio of the rubber thickness to the apex of the ridge to the rubber thickness at the smooth surface is preferably 90% to 110%. Thus, a favorable level of unevenness can be formed by the ridges on the decorative region. This is advantageous in that uniformity is improved. Note that the rubber thickness is a thickness of rubber between the outer surface of the carcass layer to the corresponding outer surface (the outer surface of the smooth surface portion or the apex of the ridge) in the meridian cross section.

Preferably, with the present technology, the display regions include two display regions provided in each of the pair of sidewall portions, the two display regions are arranged in each of the sidewall portions with an angle between straight lines connecting between centers of the display regions in the tire circumferential direction and a tire axis center being 170° to 190°, and an offset angle between ones of the display regions in the sidewall portion on the one side and the sidewall portion on the other side that are arranged closest to each other about a tire axis is 80° to 100°. As a result, favorable arrangement of the display regions in each sidewall portion as well as a favorable shift amount of the display regions between the sidewall portion on one side and the sidewall portion on the other side can be achieved. These are advantageous in that uniformity is improved.

In the present technology, an angle between one end and the other end of the display region in the tire circumferential direction about the tire axis is preferably equal to or larger than 45° and equal to or smaller than 100°. As a result, each display region in each sidewall portion has a favorable shape, which is advantageous in that uniformity is improved.

With the present technology, preferably, the constituent units are each a recess portion with a shape of a bottom surface depicting the alphanumeric, the pattern, or the symbol, and the indication is formed as a group of a series of recess portions that is a combination of a plurality of the recess portions, and a recess amount of the recess portion from the smooth surface is 0.5 mm to 0.8 mm. With the recess portion serving as the constituent unit of the indication as described above, the display region can tend to have a reduced rubber amount as in the decorative region that tends to have a reduced rubber amount due to the valleys between the ridges being recessed from the reference surface (smooth surface) in the display region. Thus, a difference between the display region and the decorative region in the rubber amount in each of the sidewall portions can be reduced. This is advantageous in that uniformity is improved.

In this case, a specification where the bottom surface of the recess portion is provided with the serration processing may be employed. This improves the visibility of each recess portion.

DETAILED DESCRIPTION

Configurations of embodiments of the present technology will be described in detail below with reference to the accompanying drawings.

Figure 1:
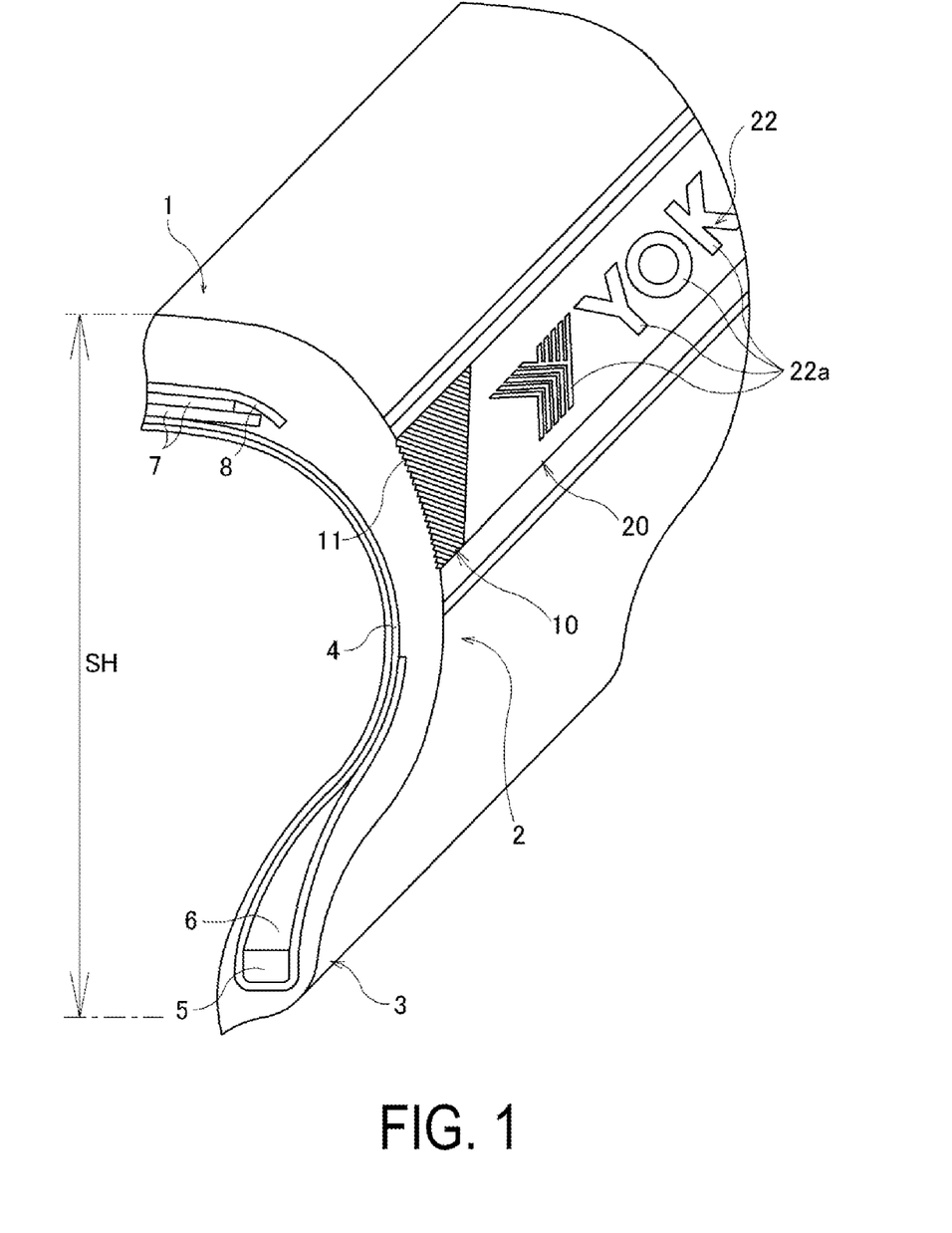
FIG. 1 is a schematic meridian cross-sectional and perspective view of a pneumatic tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed in the sidewall portions 2 in an inner side in a tire radial direction. Additionally, FIG. 1 only illustrates a main part, and accordingly, although not illustrated, each of the tread portion 1, the sidewall portion 2, and the bead portions 3 extends in the tire circumferential direction to form an annular shape. Thus, the basic structure of the toroidal shape of the pneumatic tire is configured. Each of the tire components extends in the tire circumferential direction to form an annular shape.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a pneumatic tire having a general cross-sectional structure; however, the basic structure is not limited to the aforementioned structure.

Figure 2:
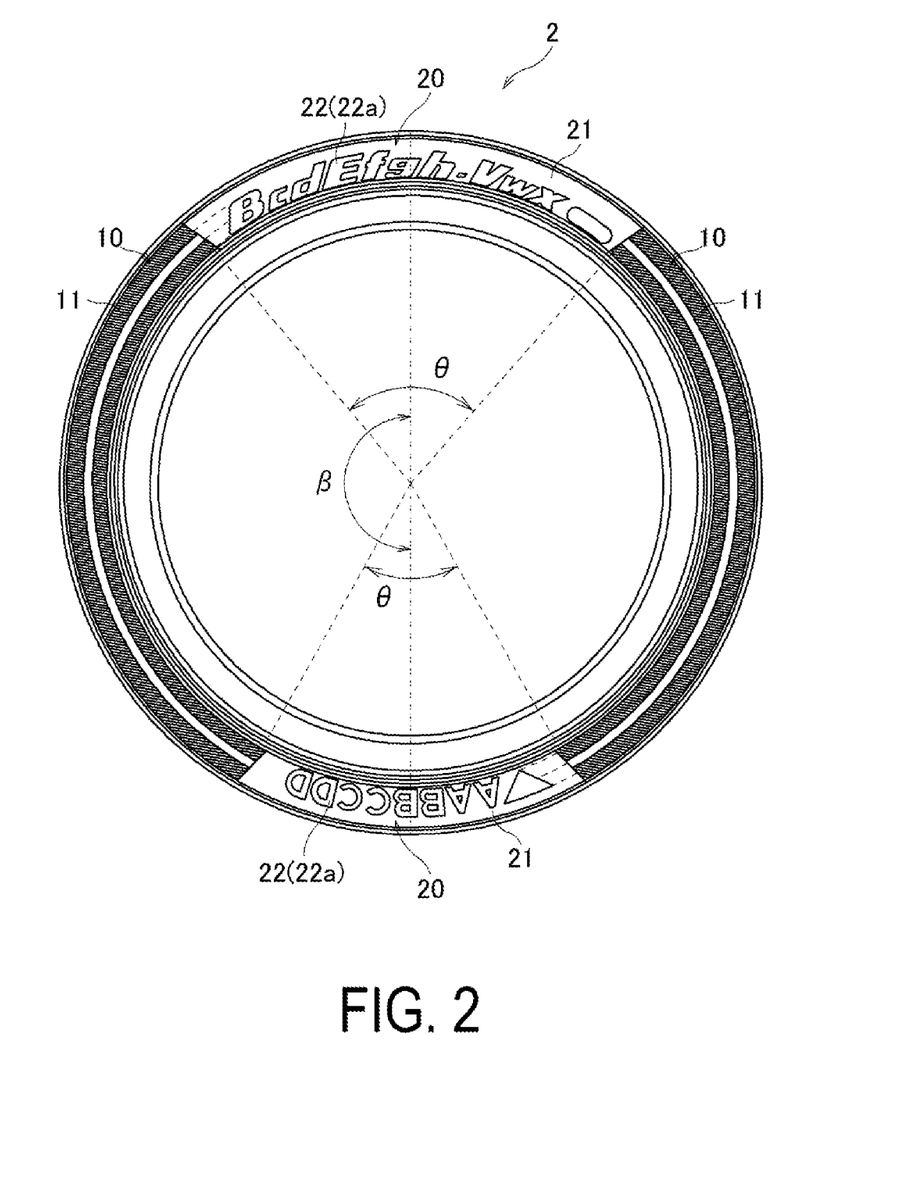
FIG. 2 is a side view of the pneumatic tire according to an embodiment of the present technology.

In the present technology, as illustrated in FIG. 2, a decorative region 10 and a display region 20 described later are provided in regions disposed on an outer side of the tire maximum width position in the tire radial direction, on the outer surface of the sidewall portion 2. In the example illustrated in FIG. 2, two decorative regions 10 and two display regions 20 are provided, and these regions are disposed alternately in the tire circumferential direction. Thus, in each of the sidewall portions 2, a positional relationship is established in which the two decorative regions 10 are arranged opposite to each other, and the two display regions 20 are arranged opposite to each other.

The decorative region 10 is a region provided with serration processing, and thus is formed by an array of a plurality of ridges 11 parallel to each other. As illustrated in an enlarged view in FIG. 3, the ridges 11 have, for example, triangular cross sections. A width w of the individual ridges 11 (the distance between the valleys between adjacent ridges 11) is, for example, 0.5 mm to 1.5 mm. A height h from the valley between adjacent ridges 11 to the apex of the ridge 11 is 0.2 mm to 0.5 mm, for example. In the decorative region 10, the valleys formed between adjacent ridges 11 are recessed relative to a reference surface of the sidewall portion 2 (a smooth surface 21 of the display region described later). Thus, the decorative region 10 is a region in which the rubber amount tends to decrease. Note that the decorative regions 10 are a region with an annular shape as illustrated in FIG. 2, and the outer surface of the sidewall portion 2 is rounded as illustrated in FIG. 1. In this context, the plurality of ridges 11 need not be completely parallel to each other, meaning that inclination by approximately ±5° is tolerated.

The display region 20 is a region that at least partially includes the smooth surface 21, without the ridges 11, as a portion extending in the tire circumferential direction between the end portions of the decorative region 10, and is provided with an indication 22 formed as a combination of constituent units 22a each depicting an alphanumeric, pattern, or symbol. In the illustrated example, two display regions 20 are provided. One display region 20 is provided with an indication 22 formed by a character string "BcdEfgh-Vwx" followed by an oval figure. Specifically, the indication is a combination of a constituent unit 22a depicting the alphanumeric "B", a constituent unit 22a depicting the alphanumeric "c", a constituent unit 22a depicting the alphanumeric "d", a constituent unit 22a depicting the alphanumeric "E", a constituent unit 22a depicting the alphanumeric "f", a constituent unit 22a depicting the alphanumeric "g", a constituent unit 22a depicting the alphanumeric "h", a constituent unit 22a depicting the symbol "-", a constituent unit 22a depicting the character string "V", a constituent unit 22a depicting the character string "w", a constituent unit 22a depicting the character string "x", and a constituent unit 22a depicting an oval figure. The other display region 20 is provided with an indication 22 formed by a triangular figure followed by a character string "AABBCCDD". Specifically, the indication is a combination of a constituent unit 22a depicting a triangular figure, constituent units 22a depicting the alphanumeric "A", constituent units 22a depicting the alphanumeric "B", constituent units 22a depicting the alphanumeric "C", and constituent units 22a depicting the alphanumeric "D". In both display regions 20, the entire surface (background of the character string) excluding the indication 22 is the smooth surface 21.

Figure 4:
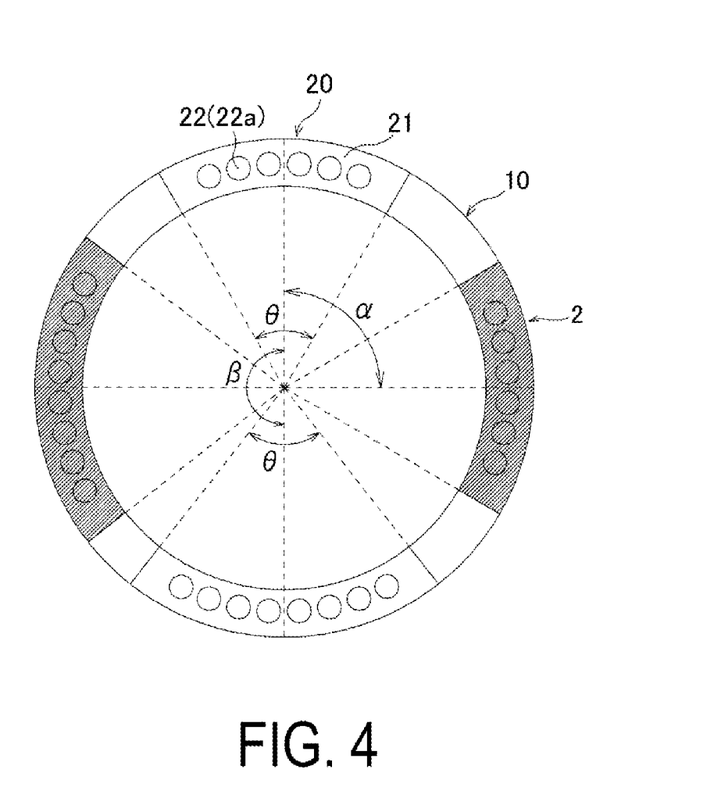
FIG. 4 is a schematic view illustrating a positional relationship between display regions.

Furthermore, as illustrated in FIG. 4, the display region 20 provided on the sidewall portion 2 on one side and the display region 20 provided on the sidewall portion 2 on the other side are arranged at positions shifted from each other in the tire circumferential direction. As a result, the decorative regions 10, respectively provided in the sidewall portion 2 on one side and in the sidewall portion 2 on the other side, at least have their centers in the tire circumferential direction shifted from each other in the tire circumferential direction. Note that FIG. 4 illustrates the sidewall portion 2 on one side and the sidewall portion 2 on the other side in an overlapping manner, with the serration processing (ridges 11) omitted, with the constituent units 22a provided in the display region 20 abbreviated using circle marks, and with the display region 20 in the sidewall portion 2 on one side hatched for illustrating the positional relationship between the decorative regions 10 and the display regions 20 in the pair of sidewall portions 2.

With the display region 20 and the decorative region 10 provided in this manner, regions (the display regions 20 and the decorative regions 10) with approximately the identical level of increase/decrease in the rubber amount are arranged in the sidewall portion 2 on one side and the sidewall portion 2 on the other side while being shifted from each other. Thus, the sidewall portion 2 on one side and the sidewall portion 2 on the other side have regions where the rubber amount is large and regions where the rubber amount is small alternately arranged. Thus, the increase/decrease in the rubber amount can be offset between the pair of sidewall portions 2, whereby excellent uniformity can be achieved, and the vibration during traveling can be suppressed.

The decorative region 10 and the display region 20 are provided in the regions disposed on an outer side, in the tire radial direction, of the tire maximum width positions of the outer surfaces of the sidewall portions 2. These regions are separated from other reinforcing materials (such as the bead filler 6 and the belt layer 7) and only include the rubber layer forming the carcass layers 4 and the sidewall portions 2. Furthermore, the regions are portions with the smallest rubber thickness in the tire. Thus, the regions are largely affected by the change in the rubber amount due to the ridges 11 and the indication 22. Thus, the structure described above is effectively employed for improving the uniformity and suppressing the vibration during traveling.

A region is considered to be the decorative region 10 if a major part of the region is decorated by the serration processing. For example, in the illustrated example, the decorative region 10 includes a part not provided with the serration processing (a center portion of the decorative region 10 in the tire radial direction). Still, the entire region including the portion not provided with the serration processing is regarded as the decorative region 10 as long as the area of the portion not provided with the serration processing is within 30% of the total area of the decorative region 10. Note that the total area of the decorative region 10 is the area between the boundaries between the decorative region 10 and the display regions 20, and between an arc centered on the tire axis passing through the edge on the inner side in the tire radial direction provided with the serration processing and an arc centered on the tire axis passing through the edge on the outer side in the tire radial direction provided with the serration processing.

Figure 3:
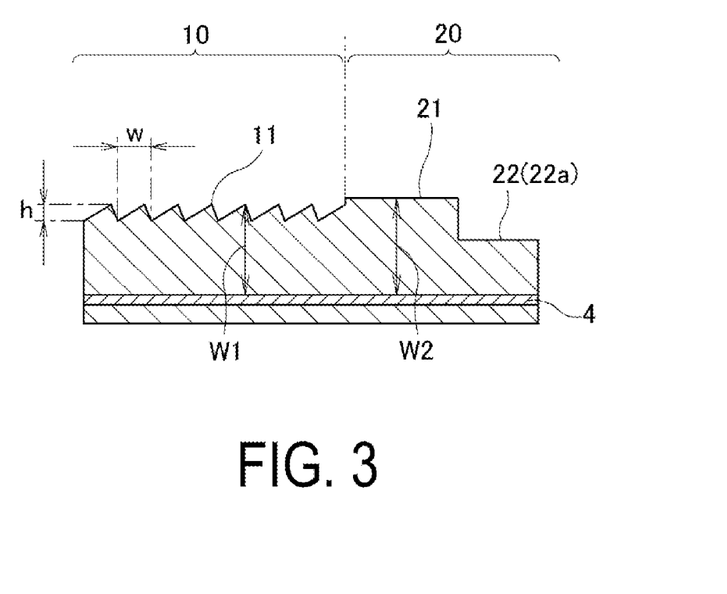
FIG. 3 is a schematic cross-sectional view illustrating the shape of a decorative region.

In the decorative region 10, the ridges 11 are configured with the dimensions described above. Preferably, a ratio of a rubber thickness W1 to the apex of the ridge 11, to a rubber thickness W2 at the smooth surface 21 of the display region 20 is preferably 90% to 110%. Thus, a favorable level of unevenness can be formed by the ridges 11 on the decorative region 10. This is advantageous in that uniformity is improved. Note that, as illustrated in FIG. 3, each of the rubber thicknesses W1 and W2 is a thickness of rubber between the outer surface of the carcass layer 4 to the outer surface of each portion (the outer surface of the smooth surface 21 or the apex of the ridge 11) in the meridian cross section. If the ratio of the rubber thickness W1 to the rubber thickness W2 is less than 90%, the reduction of the rubber amount in the decorative region 10 is too small to sufficiently achieve the uniformity improvement effect. If the ratio of the rubber thickness W1 to the rubber thickness W2 exceeds 110%, the unevenness formed by the ridges 11 is too large, resulting in durability of the ridges 11 being compromised.

Note that the display region 20 which is a region including the smooth surface 21 and the indication 22 as described above, may also include a portion (a portion provided with the serration processing for example) different from the smooth surface 21 or the indication 22. Still, when the portion other than the smooth surface 21 or the indication 22 is included, an area of such a portion does not exceed 20% of the total area of the display region 20. Note that the total area of the display region 20 is the area between the boundaries between the decorative region 10 and the display regions 20, and between an extension of an arc centered on the tire axis passing through the edge on the inner side in the tire radial direction provided with the serration processing and an extension of an arc centered on the tire axis passing through the edge on the outer side in the tire radial direction provided with the serration processing. Preferably, as illustrated in the figure, the entirety of the portion (background of the indication 22) excluding the indication 22 is the smooth surface 21.

The constituent unit 22a of the indication 22 is preferably a recess portion the bottom surface of which has a shape depicting an alphanumeric, pattern, or symbol. In this case, the indication 22 is formed as a series of recess portions combined into a group. When the constituent unit 22a is a recess portion, a recess amount d of the recess portion from the smooth surface 21 is preferably 0.5 mm to 0.8 mm. If the recess amount d of the recess portion is less than 0.5 mm, visibility is compromised because a difference from the smooth surface 21 is too small. If the recess amount d of the recess portion exceeds 0.8 mm, a sufficient rubber thickness from the bottom surface of the recess portion to the carcass layer 4 is difficult to secure, and this may affect the durability of the tire. When the recess portion is employed as the constituent unit 22a of the indication 22 as described above, the bottom surface of the recess portion may also be provided with the serration processing so that further improvement in the visibility can be achieved.

The constituent unit 22a of the indication 22 may be a protrusion portion, the top surface of which has a shape depicting an alphanumeric, pattern, or symbol. In this case, the indication 22 is formed as a protrusion portion group which is a series of a plurality of protrusion portions combined. Still, when the constituent unit 22a of the indication 22 is a protrusion portion, the rubber amount in the display region 20 is increased by the amount for the indication 22 (protrusion portion), resulting in a larger difference from the rubber amount of the decorative region 10 that tends to have a reduced rubber amount due to the valley between the ridges 11 being recessed relative to the reference surface (smooth surface 21) of the display region 20.

Figure 5:
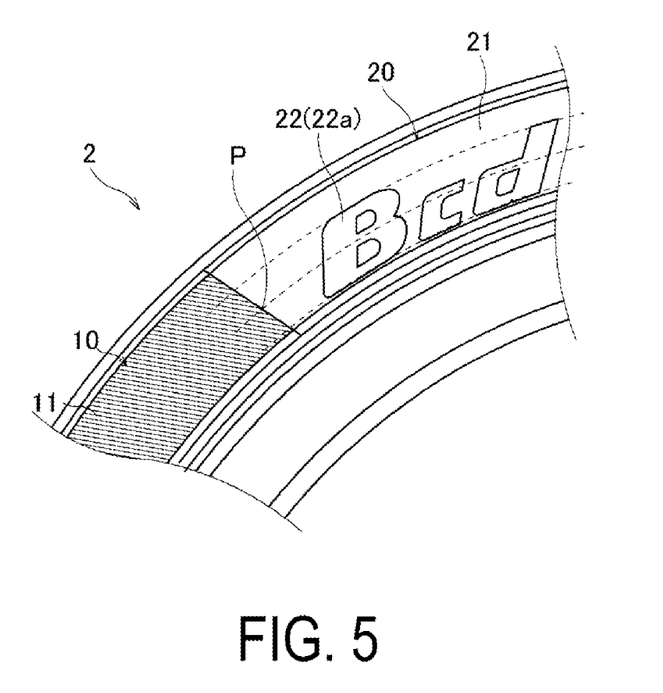
FIG. 5 is an enlarged view illustrating an area around a boundary between the decorative region and the display region.

The size of the display region 20 can be determined as appropriate in consideration of the number of the constituent units 22a (number of alphanumerics) included in the indication 22 (a character string such as a manufacturer logo, model name, or product name) employed as the indication 22 in the pneumatic tire, and of the visibility of the individual indication 22. In particular, tires that are generally available on the market have two display regions 20 for having two types of indications 22 (product model name and manufacturer logo) in many cases. In this case, an angle θ from one end to the other end of the display region 20 in the tire circumferential direction about the tire axis may be equal to or larger than 45° and equal to or smaller than 100°. As a result, each display region in each sidewall portion has a favorable shape, which is advantageous in that uniformity is improved. When the angle θ is less than 45°, the display region 20 is small, resulting in poor visibility. If the angle θ exceeds 100°, the display region 20 is too large, and the balance between the display region 20 and the decorative region 10 is compromised, resulting in an insufficient uniformity improvement effect. As illustrated in FIG. 5, the angle θ is measured based on an intersection point P between the arc centered on the tire axis passing through the center of the largest constituent unit 22a (the alphanumeric "B" in the illustrated example) in the tire radial direction and the boundary between the decorative region 10 and the display region 20.

The display regions 20 in the sidewall portion 2 on one side and in the sidewall portion 2 on the other side are arranged while being shifted from each other in the tire circumferential direction, with the range of an offset angle α determined in accordance with the number of the display regions 20, the offset angle α being an angle between the display regions 20, in the sidewall portion 2 on one side and the sidewall portion 2 on the other side, arranged closest to each other about the tire axis (an angle between straight lines connecting the tire axis and the centers of the display regions 20 in the tire circumferential direction). For example, the offset angle α is preferably 80° to 100° in an illustrated case where a pair of sidewall portions 2 are each provided with two display regions 20, with the two display regions 20 arranged opposite to each other in each of the sidewall portions 2 (with an angle β between straight lines connecting the centers of the display regions 20 in the tire circumferential direction and the tire axis center being 170° to 190°). As a result, favorable arrangement of the display regions 20 in each sidewall portion 2 as well as a favorable shift amount between the display regions 20 in the sidewall portion 2 on one side and in the sidewall portion 2 on the other side can be achieved. These are advantageous in that uniformity is improved. If the offset angle α is less than 80° or greater than 100°, an appropriate shift amount between the display regions 20 fails to be ensured, meaning that the effect of improving uniformity is limited. Note that even though the display region 20 in the sidewall portion 2 on one side and the display region 20 in the sidewall portion 2 on the other side may partially overlap depending on the size of the display regions 20, when the number of display regions 20 is not two, the offset angle α is set to be a range of (180°/N)±20 based on the number of display regions 20 in the sidewall portion 2 on one side, as long as the display regions 20 are arranged at an equal interval in each sidewall portion 2.

In the pneumatic tire, the decorative region 10 and the display region 20 (indication 22) may take various forms, and thus various settings described above can be appropriately combined in accordance with the shape of the decorative region 10 and the display region 20 (indication 22) to be employed. In any case, in tires employing various settings described above, increase/reduction in the rubber amount due to the decorative region 10 and the display region 20 (indication 22) can be offset between a pair of sidewall portions, whereby excellent uniformity can be achieved and the vibration during traveling can be suppressed.

EXAMPLE

Pneumatic tires according to Conventional Example 1 and Examples 1 to 20 (21 types) each having a tire size of 235/65R16C 115/113T, having the example basic configuration illustrated in FIG. 1, and settings as shown in Tables 1 and 2 were prepared. The settings include: the type of the indication provided in the display region provided on the outer surface of the sidewall portion; whether the bottom surface of a recess portion is provided with serration processing when the indication is formed by the recess portion; the angle θ between one end and the other end of the display region in the tire circumferential direction about the tire axis; the recess amount d of the recess portion when the indication is formed by the recess portion; an angle (offset angle α) between the display regions, in the sidewall portion on one side and the sidewall portion on the other side, arranged closest each other, about the tire axis; and the angle (an interval β of the display regions) between straight lines connecting the centers of the display regions in the tire circumferential direction and the tire axis center; and the ratio of the rubber thickness W1 to the apex of the ridge to the rubber thickness W2 at the smooth surface of the display surface (W1/W2×100%).

Note that the field for the recess amount d for Example 19 in Table 2 is empty since the example features protrusion portions provided as the constituent units of the indication. In this example, the protruding height of the protrusion portion from the smooth surface of the display region was set to 0.8 mm.

Vibration performance and display visibility of the pneumatic tires were evaluated by the following evaluation methods. The results are also indicated in Tables 1 and 2.

Vibration Performance

Each test tire was mounted on a wheel having a rim size of 16×7J, inflated to an air pressure of 350 kPa (front wheel) and 435 kPa (rear wheel), and mounted on a test vehicle. Each test tire was subjected to a sensory evaluation for vibration during straight forward traveling by test drivers on a paved road surface. In Table 1, evaluation results are expressed as index values with Conventional Example 1 being assigned the index value of 100. Larger index values indicate smaller vibration during traveling and thus indicates superior vibration performance.

Visibility

Visibility of the indication on each test tire was determined by 10 panelists through visual inspection based on the following criteria. A sum of evaluation values is obtained based on the following criteria, and in Table 1, evaluation results are expressed as index values with Conventional Example 1 being assigned the index value of 100. Larger index values indicate superior visibility.

Determination Criteria

4: Each of the constituent units (alphanumerics) of the indication was clearly recognizable.

3: Some of the constituent units (alphanumerics) of the indication were unclear, but the indication (the entire character string) as a whole seemed clear.

2: The constituent units (alphanumerics) of the indication were difficult to individually recognize, but the indication (the entire character string) as a whole was recognizable.

1: The indication as a whole seemed unclear.

TABLE 1-1

| | | | Conventional Example 1 | Example 1 | Example 2 |
|---|---|---|---|---|---|
| Display region 1 | Indication type | | Recess portion | Recess portion | Recess portion |
| | Serration processing | | No | No | No |
| | Angle θ | ° | 80 | 80 | 80 |
| | Recess amount d | mm | 0.5 | 0.5 | 0.5 |
| Display region 2 | Indication type | | Recess portion | Recess portion | Recess portion |
| | Serration processing | | No | No | No |
| | Angle θ | ° | 60 | 60 | 60 |
| | Recess amount d | mm | 0.5 | 0.5 | 0.5 |
| Offset angle α | | ° | 0 | 70 | 80 |
| Display region interval β | | ° | 180 | 180 | 180 |
| W1/W2 × 100 | | % | 100 | 100 | 100 |
| Vibration performance | | Index value | 100 | 105 | 110 |
| Visibility | | Index value | 100 | 100 | 100 |

TABLE 1-2

| | | | Example 3 | Example 4 | Example 5 | Example 6 |
|---|---|---|---|---|---|---|
| Display region 1 | Indication type | | Recess portion | Recess portion | Recess portion | Recess portion |
| | Serration processing | | No | No | No | No |
| | Angle θ | ° | 80 | 80 | 80 | 80 |
| | Recess amount d | mm | 0.5 | 0.5 | 0.5 | 0.5 |
| Display region 2 | Indication type | | Recess portion | Recess portion | Recess portion | Recess portion |
| | Serration processing | | No | No | No | No |
| | Angle θ | ° | 60 | 60 | 60 | 60 |
| | Recess amount d | mm | 0.5 | 0.5 | 0.5 | 0.5 |
| Offset angle α | | ° | 90 | 100 | 110 | 90 |
| Display region interval β | | ° | 180 | 180 | 180 | 170 |
| W1/W2 × 100 | | % | 100 | 100 | 100 | 100 |
| Vibration performance | | Index value | 115 | 110 | 105 | 110 |
| Visibility | | Index value | 100 | 100 | 100 | 100 |

TABLE 1-3

| | | | Example 7 | Example 8 | Example 9 |
|---|---|---|---|---|---|
| Display region 1 | Indication type | | Recess portion | Recess portion | Recess portion |
| | Serration processing | | No | No | No |
| | Angle θ | ° | 80 | 105 | 110 |
| | Recess amount d | mm | 0.5 | 0.7 | 0.5 |
| Display region 2 | Indication type | | Recess portion | Recess portion | Recess portion |
| | Serration processing | | No | No | No |
| | Angle θ | ° | 60 | 40 | 45 |
| | Recess amount d | mm | 0.5 | 0.5 | 0.5 |
| Offset angle α | | ° | 90 | 90 | 90 |
| Display region interval β | | ° | 190 | 180 | 180 |
| W1/W2 × 100 | | % | 100 | 100 | 100 |
| Vibration performance | | Index value | 110 | 108 | 108 |
| Visibility | | Index value | 100 | 100 | 100 |

TABLE 2-1

| | | | Example 10 | Example 11 | Example 12 | Example 13 |
|---|---|---|---|---|---|---|
| Display region 1 | Indication type | | Recess portion | Recess portion | Recess portion | Recess portion |
| | Serration processing | | No | No | No | No |
| | Angle θ | ° | 80 | 80 | 80 | 80 |
| | Recess amount d | mm | 0.5 | 0.5 | 0.5 | 0.5 |
| Display region 2 | Indication type | | Recess portion | Recess portion | Recess portion | Recess portion |
| | Serration processing | | No | No | No | No |
| | Angle θ | ° | 60 | 60 | 60 | 60 |
| | Recess amount d | mm | 0.5 | 0.5 | 0.5 | 0.5 |
| Offset angle α | | ° | 90 | 90 | 90 | 90 |
| Display region interval β | | ° | 180 | 180 | 180 | 180 |
| W1/W2 × 100 | | % | 85 | 90 | 105 | 110 |
| Vibration performance | | Index value | 105 | 110 | 118 | 121 |
| Visibility | | Index value | 100 | 100 | 100 | 100 |

TABLE 2-2

| | | | Example 14 | Example 15 | Example 16 | Example 17 |
|---|---|---|---|---|---|---|
| Display region 1 | Indication type | | Recess portion | Recess portion | Recess portion | Recess portion |
| | Serration processing | | No | No | No | No |
| | Angle θ | ° | 80 | 80 | 80 | 80 |
| | Recess amount d | mm | 0.5 | 0.4 | 0.7 | 0.8 |
| Display region 2 | Indication type | | Recess portion | Recess portion | Recess portion | Recess portion |
| | Serration processing | | No | No | No | No |
| | Angle θ | ° | 60 | 60 | 60 | 60 |
| | Recess amount d | mm | 0.5 | 0.4 | 0.7 | 0.8 |
| Offset angle α | | ° | 90 | 90 | 90 | 90 |
| Display region interval β | | ° | 180 | 180 | 180 | 180 |
| W1/W2 × 100 | | % | 115 | 105 | 105 | 105 |
| Vibration performance | | Index value | 125 | 114 | 117 | 118 |
| Visibility | | Index value | 100 | 99 | 102 | 103 |

TABLE 2-3

|  |  |  | Example 18 | Example 19 | Example 20 |
|---|---|---|---|---|---|
| Display region 1 | Indication type |  | Recess portion | Protrusion portion | Recess portion |
|  | Serration processing |  | No | - | Yes |
|  | Angle θ | ° | 80 | 80 | 80 |
|  | Recess amount d | mm | 0.9 | - | 0.5 |
| Display region 2 | Indication type |  | Recess portion | Protrusion portion | Recess portion |
|  | Serration processing |  | No | — | Yes |
|  | Angle θ | ° | 60 | 60 | 60 |
|  | Recess amount d | mm | 0.9 | — | 0.5 |
| Offset angle α |  | ° | 90 | 90 | 90 |
| Display region interval β |  | ° | 180 | 180 | 180 |
| W1/W2 × 100 |  | % | 105 | 105 | 105 |
| Vibration performance |  | Index value | 119 | 110 | 120 |
| Visibility |  | Index value | 104 | 105 | 105 |

Tables 1 and 2 clearly indicate that each of Examples 1 to 20 has improved vibration performance with the visibility favorably maintained or improved, compared with Conventional Example 1. Note that the vibration performance during straight forward traveling is largely affected by tire uniformity. Thus, each of Examples 1 to 20 with the improved vibration performance can be regarded as having excellent uniformity.

The invention claimed is:

1. A pneumatic tire, comprising:
   a tread portion extending in a tire circumferential direction to form an annular shape;
   a pair of sidewall portions provided on both sides of the tread portion; and
   a pair of bead portions provided on an inner side in a tire radial direction of the sidewall portions,
   regions disposed on an outer side, in a tire radial direction, of tire maximum width positions of outer surfaces of the pair of sidewall portions being provided with decorative regions and display regions that are adjacent to the decorative regions in the tire circumferential direction, the decorative regions being provided with serration processing to be formed by an array of a plurality of ridges parallel to each other,
   the display regions each comprising at least a portion where a smooth surface without the ridges extends in the tire circumferential direction between end portions of the decorative regions, and each being provided with an indication formed by combining constituent units each depicting an alphanumeric, a pattern, or a symbol,
   a valley formed between adjacent ones of the ridges in the decorative regions being recessed relative to the smooth surface, and
   the display regions provided in one of the sidewall portions on one side and the display regions provided in the other one of the sidewall portions on the other side being arranged at positions shifted from each other in the tire circumferential direction.

2. The pneumatic tire according to claim 1, wherein
   the display regions comprise two display regions provided in each of the pair of sidewall portions,
   the two display regions are arranged in each of the sidewall portions with an angle between straight lines connecting between centers of the display regions in the tire circumferential direction and a tire axis center being 170° to 190°, and
   an offset angle between ones of the display regions in the sidewall portion on the one side and the sidewall portion on the other side that are arranged closest to each other about a tire axis is 80° to 100°.

3. The pneumatic tire according to claim 1, wherein the angle between one end and the other end of the display region in the tire circumferential direction about the tire axis is equal to or larger than 45° and equal to or smaller than 100°.

4. The pneumatic tire according to claim 1, wherein
   the constituent units are each a recess portion with a shape of a bottom surface depicting the alphanumeric, the pattern, or the symbol, and
   the indication is formed as a group of a series of recess portions that is a combination of a plurality of the recess portions, and
   a recess amount of the recess portion from the smooth surface is 0.5 mm to 0.8 mm.

5. The pneumatic tire according to claim 4, wherein the bottom surface of the recess portion is provided with the serration processing.

6. The pneumatic tire according to claim 1, wherein a ratio of a rubber thickness to an apex of each of the ridges to a rubber thickness at the smooth surface is 90% to 110%.

7. The pneumatic tire according to claim 6, wherein
   the display regions comprise two display regions provided in each of the pair of sidewall portions,
   the two display regions are arranged in each of the sidewall portions with an angle between straight lines connecting between centers of the display regions in the tire circumferential direction and a tire axis center being 170° to 190°, and
   an offset angle between ones of the display regions in the sidewall portion on the one side and the sidewall portion on the other side that are arranged closest to each other about a tire axis is 80° to 100°.

8. The pneumatic tire according to claim 7, wherein the angle between one end and the other end of the display region in the tire circumferential direction about the tire axis is equal to or larger than 45° and equal to or smaller than 100°.

9. The pneumatic tire according to claim 8, wherein
   the constituent units are each a recess portion with a shape of a bottom surface depicting the alphanumeric, the pattern, or the symbol, and
   the indication is formed as a group of a series of recess portions that is a combination of a plurality of the recess portions, and
   a recess amount of the recess portion from the smooth surface is 0.5 mm to 0.8 mm.

10. The pneumatic tire according to claim 9, wherein the bottom surface of the recess portion is provided with the serration processing.

* * * * *